June 24, 1930.  N. BISHOP  1,768,286
RADIORECEIVER
Filed April 20, 1928
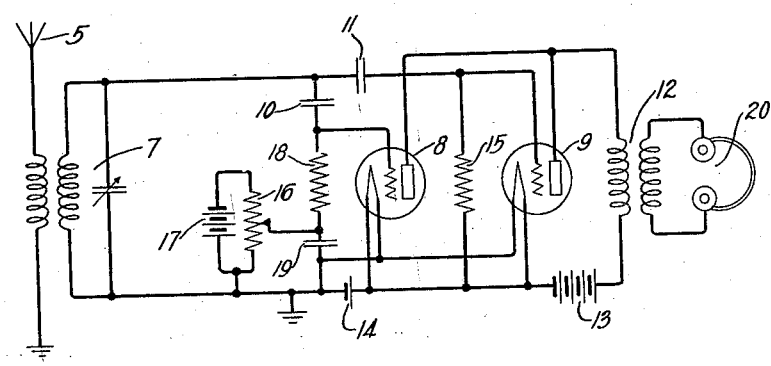
INVENTOR
NATHANIEL BISHOP
BY
J. P. Neville
ATTORNEY Patented June 24, 1930

1,768,286

UNITED STATES PATENT OFFICE

NATHANIEL BISHOP, OF BRIDGEPORT, CONNECTICUT, ASSIGNOR TO BELL TELEPHONE LABORATORIES, INCORPORATED, OF NEW YORK, N. Y., A CORPORATION OF NEW YORK

RADIORECEIVER

Application filed April 20, 1928. Serial No. 271,434.

This invention relates to carrier signaling systems and more particularly to the elimination of the effects of interfering waves.

An object of the invention is to limit the effect of interference due to static and other disturbances.

Another object is to afford protection against high voltage discharges.

In a specific embodiment of this invention, two electric discharge devices are connected in parallel to receive incoming signal waves. A condenser and grid leak resistance are included in the input circuit of one device which operates to detect the incoming waves and to supply the detected current to a low frequency circuit. The grid of the other device is so negatively biased that, for incoming waves of amplitude below a predetermined value, it operates merely as a repeater to transmit the signal waves to the low frequency circuit. For waves of amplitude above the selected value, however, the second device operates to detect the incoming waves to produce a low frequency current.

As is well known, signal potentials applied to a device operating as a grid leak detector will cause a decrease in the current produced in its output circuit. Under similar conditions, a negatively biased detector will function to increase the current flowing through its output circuit.

When a signal wave of abnormal amplitude is applied to the common input circuit of the two devices, the detected current supplied to the common output circuit by the negatively grid polarized detector will be in opposite phase to that supplied by the detector provided with the leak resistance. In this manner the effect of the waves of abnormal amplitude, which in general are due to static or to nearby interfering stations, upon the low frequency circuit is accurately controlled. By properly selecting the discharge devices and the constants of the associated circuits, the system may be operated to cause the ratio of signal currents to noise currents, due to interfering waves, to be maintained constant.

The present invention will be more readily understood by reading the following detailed description in connection with the drawing, which diagrammatically illustrates, by way of example, a radio receiver embodying the invention.

In the system shown in the drawing an antenna 5 is coupled to a resonant circuit 7 tuned to the frequency of the wave to be received.

Two three-electrode electric discharge devices 8 and 9 are connected in parallel to the resonant circuit 7. The connections to the grids are made through the condensers 10 and 11, respectively. The output circuits of the discharge devices are also connected in parallel and may be traced from the respective anodes through the primary winding of transformer 12 and space current battery 13 to the common cathode circuit. A receiver 20 is connected to the secondary winding of transformer 12.

Cathode heating current is supplied to the discharge devices by a battery 14, connected in the common cathode circuit.

A leak resistance 15 is connected between the grid of the device 9 and the positive cathode terminal. This resistance and the condenser 11 cooperate to cause the device 9 to operate as a condenser-grid leak detector in the well known manner. As is now well understood, a signal wave impressed on the grid of device 9 causes a decrease in the average plate current.

A grid biasing battery 17 and associated potentiometer 16 are connected in the input circuit of the device 8. The negative terminal of this potentiometer-battery circuit is connected to the grid of device 8 through resistance 18. As is well recognized, such a detector, i. e. one having a negatively biased grid, will respond to a signal wave impressed on its grid to cause an increase in the average plate current.

The potentiometer 16 is so adjusted that, for received waves of amplitude below a predetermined value, the device 8 operates on the linear portion of its grid-voltage-plate-current characteristic to repeat the impressed signal wave without detecting it.

For waves of amplitude below the predetermined level, the system operates as if but one detector were used. In this range the received waves are detected by the device 9 and the resulting low frequency signals are impressed on the receivers 20, the device 8 merely operating to repeat the received high frequency wave and supply it to the output circuit where its energy is dissipated.

Waves of amplitude above the predetermined level, in addition to being detected by the discharge device 9 are also detected by the device 8. As pointed out above, the device 8 responds to an increase in amplitude of the incoming signal wave to cause the amplitude of the low frequency wave in the output circuit to increase, while the device 9 responds to an increase in amplitude of the incoming signal wave to decrease the amplitude of the low frequency wave produced in the output circuit. In other words, the low frequency waves produced by the detecting action of the devices 8 and 9, respectively, are of opposite phase.

Incoming signal waves of abnormal amplitude are therefore detected by the device 8 to produce low frequency waves which oppose those produced by the detecting action of device 9. The resulting wave which is effective in the receiver 20 is the difference in the components supplied by the devices 8 and 9.

By properly selecting the constants of the circuits respectively associated with the devices 8 and 9, the amplitude of the wave supplied to receiver 20 may be maintained constant, or may be caused to increase or decrease as the amplitude of the signal wave departs from the predetermined value.

In general, the waves of abnormal amplitude supplied to the receiver are due to static and interfering stations.

The present invention therefore provides a system for reducing the effect of the interfering waves. It also enables the ratio of the signal-to-noise currents to be accurately controlled, i. e., to be maintained constant or to be varied in a predetermined manner at the will of the operator.

What is claimed is:

1. In combination, a carrier frequency circuit, a low frequency circuit, a pair of translating devices connected in parallel between said circuits, one of said devices being operated to produce low frequency waves in response to signal waves in said carrier frequency circuit, and means for causing the other of said devices to produce low frequency waves only when the amplitude of said signal waves exceeds a predetermined value, while operating as a repeater for signal waves of amplitude below said value.

2. In a radio receiver, a high frequency circuit, a low frequency circuit, an electric discharge device connected between said circuits and operating in response to an increase in the current in said high frequency circuit to produce a decrease in the current in said low frequency circuit, and a second electric discharge device connected in parallel with the first device and operating in response to an increase in the current in said high frequency circuit to produce an increase in the current flowing in said low frequency circuit, and means for causing said second device to supply low frequency current to said low frequency circuit only when the amplitude of the high frequency waves is above a predetermined value, while repeating high frequency waves of amplitude below said value.

3. In combination, a receiving circuit, a pair of electric discharge devices each having input and output circuits, the input circuits of said devices being connected in parallel to said receiving circuit, means connected in the input circuit of one of said devices for causing it to operate as a grid current detector, and means connected in the input circuit of the other of said devices for causing it to act as a repeater for impressed waves of normal amplitude and as a detector to produce currents of opposite phase to those produced by said first device when waves of abnormal amplitude are supplied by said receiving circuit.

4. In a radio receiving circuit, a high frequency circuit, a signal responsive circuit, an electric discharge device connected between said circuits and having a condenser and grid leak resistance included in its input circuit, and a second electric discharge device connected in parallel with said first device and having a control electrode so negatively biased with respect to its cathode that for high frequency waves below a predetermined amplitude, said second detector operates as a repeater.

5. The method of limiting the effects of interference in a radio receiving circuit comprising a pair of detectors connected in parallel, which method comprises continuously operating one of said detectors to produce low frequency waves in response to the received high frequency waves, operating the other of said detectors to amplify received high frequency waves of amplitude below a predetermined level without producing low frequency waves, and operating said other detector to detect received high frequency waves of amplitude above said level to produce low frequency waves of opposite phase to those produced by the first detector.

6. A radio receiver comprising a high frequency circuit, a signal responsive circuit, a plurality of electric discharge devices connected in parallel between said circuits, and means for causing one of said devices to operate as a detector and another of said devices to operate as a repeater for signal waves of one predetermined range of amplitudes and for causing both of said devices to operate as detectors for waves of another predetermined range of amplitudes.

In witness whereof, I hereunto subscribe my name this 19th day of April, 1928.

NATHANIEL BISHOP.